United States Patent [19]

Jax

[11] Patent Number: 5,708,218

[45] Date of Patent: Jan. 13, 1998

[54] METHOD AND DEVICE FOR LOCATING ACCUMULATIONS OF POLLUTANTS

[75] Inventor: Peter Jax, Erlangen, Germany

[73] Assignee: Siemens Aktiengesellschaft, Munich, Germany

[21] Appl. No.: 502,076

[22] Filed: Jul. 14, 1995

[30] Foreign Application Priority Data

Jul. 14, 1994 [DE] Germany ............... 44 24 909.8

[51] Int. Cl.[6] ............... G01N 1/22; G01N 1/14
[52] U.S. Cl. ............... 73/863.23; 73/31.02; 73/864.34
[58] Field of Search ............... 73/863.23, 863.31, 73/863.33, 864.34, 864.35, 31.02

[56] References Cited

U.S. PATENT DOCUMENTS

| | | | |
|---|---|---|---|
| 3,964,292 | 6/1976 | Jackson | 73/40.5 R |
| 4,559,831 | 12/1985 | Prestele | 73/861.05 |
| 4,704,897 | 11/1987 | Kawase et al. | 73/40.5 R |
| 4,735,095 | 4/1988 | Issel | 73/864.81 |
| 4,791,820 | 12/1988 | Lawrence et al. | 73/864.34 X |
| 5,046,353 | 9/1991 | Thompson | 73/40.7 |
| 5,054,328 | 10/1991 | Long et al. | 73/863.23 X |
| 5,060,508 | 10/1991 | Wong | 73/31.02 |

FOREIGN PATENT DOCUMENTS

| | | | |
|---|---|---|---|
| 190718 | 8/1986 | European Pat. Off. | 73/863.33 |
| 0175219 | 5/1988 | European Pat. Off. | |
| 0525594 | 2/1993 | European Pat. Off. | |
| 2670893 | 6/1992 | France | 73/863.33 |
| 2013682 | 10/1971 | Germany | 73/863.33 |
| 2431907 | 3/1978 | Germany | |
| 158190 | 1/1983 | Germany | 73/863.31 |
| 8427528 | 1/1985 | Germany | |
| 8427529 | 1/1985 | Germany | |
| 3305005 | 2/1985 | Germany | |
| 243983 | 3/1987 | Germany | |
| 273499 | 11/1989 | Germany | |
| 9110188 | 3/1992 | Germany | |
| 4125739 | 2/1993 | Germany | |
| 3417332 | 12/1993 | Germany | |
| 4242806A1 | 6/1994 | Germany | |
| 85352 | 5/1985 | Japan | 73/863.33 |
| 200145 | 10/1985 | Japan | 73/863.33 |

OTHER PUBLICATIONS

Patents Abstracts of Japan, P–403, Nov. 8, 1985, vol. 9, No. 281 & JP–A–60–123732 (Yoshio) Jul. 2, 1985.
Patents Abstracts of Japan, P–683, Apr. 2, 1988, vol. 12, No. 100 & JP–A–62–233721 (Nissan) Oct. 14, 1987.

*Primary Examiner*—Thomas P. Noland
*Attorney, Agent, or Firm*—Herbert L. Lerner; Laurence A. Greenberg

[57] ABSTRACT

A method for locating an accumulation of pollutants includes continuously guiding a conveying medium in mutually opposite directions through two legs of a pollutant-permeable collecting line, the legs being placed closely adjacent and mutually parallel as forward and return lines. A detection is performed as to whether or not the conveying medium contains a pollutant at an outlet of the collecting line. A location of an accumulation of pollutants at the collecting line is determined from a difference in time between two successive pollution detections at the outlet of the collecting line. A device for locating accumulations of pollutants includes a collecting line being permeable to a pollutant and having two legs being closely adjacent, mutually parallel and switched as forward and return lines. A continuously operating pump is connected to the collecting line for conveying a conveying medium through the collecting line. A sensor is connected to the collecting line for detecting a pollutant. An evaluation unit is connected to the sensor.

6 Claims, 2 Drawing Sheets

METHOD AND DEVICE FOR LOCATING ACCUMULATIONS OF POLLUTANTS

BACKGROUND OF THE INVENTION

Field of the Invention

The invention relates to a method for locating an accumulation of pollutants with a collecting line being permeable to a pollutant, wherein a conveying medium is guided through the collecting line and a detection is performed at the outlet of the collecting line as to whether or not he conveying medium contains a pollutant.

The invention also relates to a device for locating an accumulation of pollutants with a collecting line being permeable to a pollutant, wherein the collecting line is connected to a pump for conveying a conveying medium through the collecting line and to a sensor for detecting the pollutant, and the sensor is connected to an evaluation unit.

Such a method and such a device for executing the method are known from German Published, Non-Prosecuted Application DE 41 25 739 A1. It is important therein that samples from a number of measuring points are checked for pollutants by simple devices without a necessity for a multiplicity of sensors. In addition, the leakage detection and locating system (LEOS) known from German Patent DE-PS 24 31 907 is employed with the known method. That system is distinguished by a collecting line through which a conveying medium is fed at intervals. The collecting line is constructed in such a way that a pollutant which is present in its vicinity can penetrate it. That takes place within a diffusion period between two intervals during which the conveying medium is fed through the collecting line. The penetrating pollutant together with the conveying medium is fed to a sensor disposed at the end of the collecting line during the conveying interval following a diffusion period. The pollutant is identified there. The location at the collecting line where the pollutant has penetrated the line is determined from the period of time from the start of the conveying interval during which the conveying medium flows until the arrival of the pollutant at the sensor. The known flow speed of the conveying medium is used therefor.

The collecting line disclosed in German Published, Non-Prosecuted Application DE 41 25 739 A1 has individual sample entry openings which correspond to measuring points. Pollutants can penetrate the collecting line only at those sample entry openings. For example, the wall of the collecting line can be permeable to the pollutant in the section of the sample entry opening and impermeable otherwise. The permeable section can be formed by a diffusion diaphragm which can be formed of a sintered metal or plastic. However, controllable valves can also be disposed as sample entry openings in the collecting line.

Flushing the collecting line with the conveying medium in intervals requires that the pump which is intended therefor be switched on and off again at intervals. In order to be able to locate a pollutant entry into the collecting line, it is necessary that the time during which the pump is switched on be detected as exactly as possible. For that purpose the pump must be connected with the evaluation unit, which is also in contact with the sensor.

Locating an accumulation of pollutants takes place relatively slowly because a diffusion period alternatingly follows a conveying interval.

SUMMARY OF THE INVENTION

It is accordingly an object of the invention to provide a method and a device for locating an accumulation of pollutants, which overcome the hereinafore-mentioned disadvantages of the heretofore-known methods and devices of this general type, which can be used without an elaborate control for a pump and which allow rapid locating.

With the foregoing and other objects in view there is provided, in accordance with the invention, a method for locating an accumulation of pollutants or harmful substances, which comprises continuously guiding a conveying medium in mutually opposite directions through two legs of a pollutant-permeable collecting line, the legs being placed closely adjacent and mutually parallel as forward and return lines; detecting if the conveying medium contains a pollutant at an outlet of the collecting line; and determining a location of an accumulation of pollutants at the collecting line from a difference in time between two successive pollution detections at the outlet of the collecting line.

Since two legs of the same collecting line have been placed closely together, a pollutant occurring only at one location penetrates the collecting line at two locations which are at a distance from each other, in relation to the collecting line. Accordingly, two pollutant maxima are registered at the outlet of the collecting line at an interval in time. The time period between these two maxima corresponds to the time period required for the conveying medium to travel from one of the closely adjoining locations where the pollutant has penetrated to the other one, through the collecting line. Given the condition that the two locations lie next to each other and with the flow speed of the conveying medium being known, it is possible to exactly calculate the location of the entry of the pollutant from the length of time between the maxima.

For example, the two legs of the collecting line are connected in series and are placed parallel to each other to form an advancing or forward line and a return line. The distance travelled by the conveying medium during the time period $\Delta t$ between the two maxima, which can be determined with the aid of the known speed v of the conveying medium, then corresponds to twice the distance between the location where the pollutant has penetrated the collecting line and the point where the two legs (advancing and return lines) are connected with each other, for example through the use of a U-shaped curved piece. Therefore, the sought-out location of the accumulation of pollutants lies in the collecting line at a distance $Z=\frac{1}{2} v \Delta t$ from the point where the advancing and return lines are connected with each other, wherein the distance corresponds to one half of that segment traveled by the conveying medium during the period of time $\Delta t$.

The advantage of permitting the exact location of accumulations of pollutants is achieved through the use of the method according to with the invention, without making it necessary to move the conveying medium at intervals. In an advantageous manner one continuously operating pump is sufficient. An additional advantage which is gained is that because of the continuous operation of the pump, locating may be carried out more rapidly than with known methods.

In accordance with another mode of the invention, an independent conveying line is formed by each one of the two legs. In the course of this method, each leg is equipped with its own pump for the conveying medium and with its own sensor for detecting the pollutant maxima. The time period $\Delta t$ between successive pollutant maxima is then determined at the first and second sensors for locating the accumulation of pollutants. Otherwise, the evaluation is performed in accordance with the equation $$x = \frac{a - v\Delta t}{2}.$$

In this case, x is the distance of the accumulation of pollutants from the sensor first indicating pollutant maxima, a is the length of a leg, v is the speed of the conveying medium and Δt is the determined length of time.

In accordance with a further mode of the invention, in order to calibrate the locating method, a test gas can be brought into the vicinity of the adjacent legs of the collecting line at a known location, or a test gas can be simultaneously introduced at adjacent locations of the two legs of the collecting line.

With the objects of the invention in view, there is also provided a device for locating accumulations of pollutants or harmful substances, comprising a collecting line being permeable to a pollutant and having two legs being closely adjacent, mutually parallel and switched as forward and return lines; a continuously operating pump being connected to the collecting line for conveying a conveying medium through the collecting line; a sensor being connected to the collecting line for detecting a pollutant; and an evaluation unit being connected to the sensor.

It is possible through the use of such a device to locate an accumulation of pollutants in an advantageous manner without it being necessary for the pump to operate in intervals. Such an interval control of a pump would be expensive. A continuously operating pump needing no control is sufficient. When using such a pump, the device can locate an accumulation of pollutants very rapidly. Since the pollutant always simultaneously penetrates both legs of the collecting lines that are disposed closely together, it is possible to exactly determine the location where the pollutant has penetrated the collecting line from the difference in time with which two pollutant maxima arrive at a sensor during the continuous flushing of the collecting line.

In accordance with another feature of the invention, the two legs are connected in series, for example through the use of a U-shaped connecting piece. In that case one pump and one sensor are enough.

In accordance with a further feature of the invention, each one of the two legs is constructed as an independent conveying line. In this case each conveying line requires a pump and a sensor. The two sensors then need to be connected with a common evaluation unit.

In accordance with an added feature of the invention, locations which are permeable to pollutants are disposed in the legs of the collecting line, while the remaining portions of the legs are impermeable. In this case it is important that the respective permeable locations in the two legs are disposed spatially close together. A pair of two permeable locations that are associated with each other in the legs advantageously operates like a single sensor. A multiplicity of such pairs of permeable locations in the legs of the collecting line advantageously replaces a large number of individual, expensive sensors.

The permeable locations can be formed by valves or by diffusion diaphragms of sintered metal or plastic installed in the collecting line.

The measuring process is simplified by the spatial restriction to individual measuring locations.

In order to calibrate the device for locating an accumulation of pollutants it is possible to inject a test gas in the vicinity of the collecting line in a directed manner. However, in the process both legs need to be charged with the test gas in the same manner.

It is also possible to introduce the test gas into the line. For this purpose it is necessary to provide openings in both legs, which are spatially very close.

In accordance with a concomitant feature of the invention, in order to ensure that the test gas can be simultaneously introduced into both legs, spatially adjoining openings in the legs are, for example, connected through a T-shaped line segment or piece with a calibrating line through which the test gas is brought in.

In particular, the advantage of detecting the location of an accumulation of pollutants with simple devices and rapidly, is achieved through the use of the method and the device in accordance with the invention.

Other features which are considered as characteristic for the invention are set forth in the appended claims.

Although the invention is illustrated and described herein as embodied in a method and a device for locating accumulations of pollutants, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
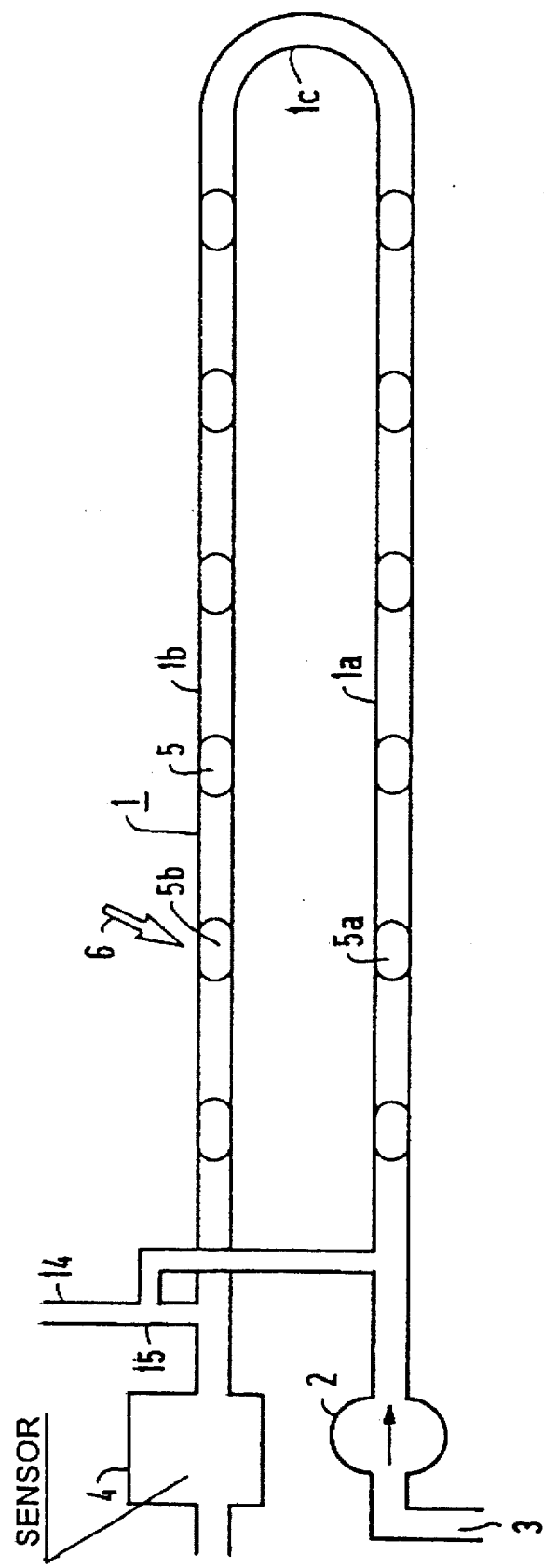
FIG. 1 is a diagrammatic, elevational view of a first embodiment of a device for locating accumulations of pollutants.

Referring now to the figures of the drawing in detail and first, particularly, to FIG. 1 thereof, there is seen a collecting line 1, through which a conveying medium is fed by a pump 2. This conveying medium can be air, which is aspirated at an aspiration point 3. However, the conveying medium can also be another gas. As viewed in the direction of flow, the pump 2 is disposed at the beginning of the collecting line 1. However, it can also be disposed at the end of the collecting line 1. As viewed in the direction of flow, the collecting line 1 is formed of a first and a second leg 1a and 1b. The second leg 1b is connected through a U-shaped connecting piece 1c with the first leg 1a and therefore is disposed parallel with the first leg 1a. The two legs 1a and 1b are placed close to each other and the conveying medium flows in opposite directions through them. A sensor 4, which can be used to identify the pollutant to be located, is disposed at the end of the second leg 1b. The collecting line 1 represented in FIG. 1 has locations 5 which are permeable to the pollutant, but otherwise it is formed of a material that is impermeable to the pollutant. In this connection it is important that a permeable location 5b in the second leg 1b always be directly associated with a spatially close, corresponding permeable location 5a in the parallel first leg 1a. In this case the distance between the permeable locations 5a and 5b of such a pair of locations is as short as possible.

In case a pollutant reaches the vicinity of the collecting line 1 along a path marked by an arrow 6, it simultaneously penetrates the permeable locations 5a and 5b in both legs 1a and 1b. There, the pollutant is immediately caught by the continuously flowing conveying medium and conveyed to the sensor 4. In the process the spatial distance between the two concentration maxima of the pollutant in the collecting line 1 remains the same until the sensor 4 has been reached. This spatial distance corresponds to the spatial distance between the two permeable locations 5a and 5b as measured in the flow direction along the collecting line 1.

The two concentration maxima arrive with a time difference at the sensor 4. The spatial distance can be determined therefrom in a simple manner by an evaluating unit which may, for example, be integrated in the sensor 4, through the use of the flow speed of the conveying medium which is constant and known in the continuous pumping process.

On the basis of the geometry of the collecting line illustrated in FIG. 1, the spatial distance between the two concentration maxima corresponds to twice the distance between the connecting piece 1c and the pair of impermeable locations 5a and 5b through which the pollutant has penetrated the two legs 1a and 1b of the collecting line 1.

The exact location where the pollutant has appeared can therefore be obtained by measuring half of the spatial distance between the two concentration media along the collecting line 1, starting at the connecting piece 1c.

An accumulation of pollutants can be easily located in this manner.

Figure 2:
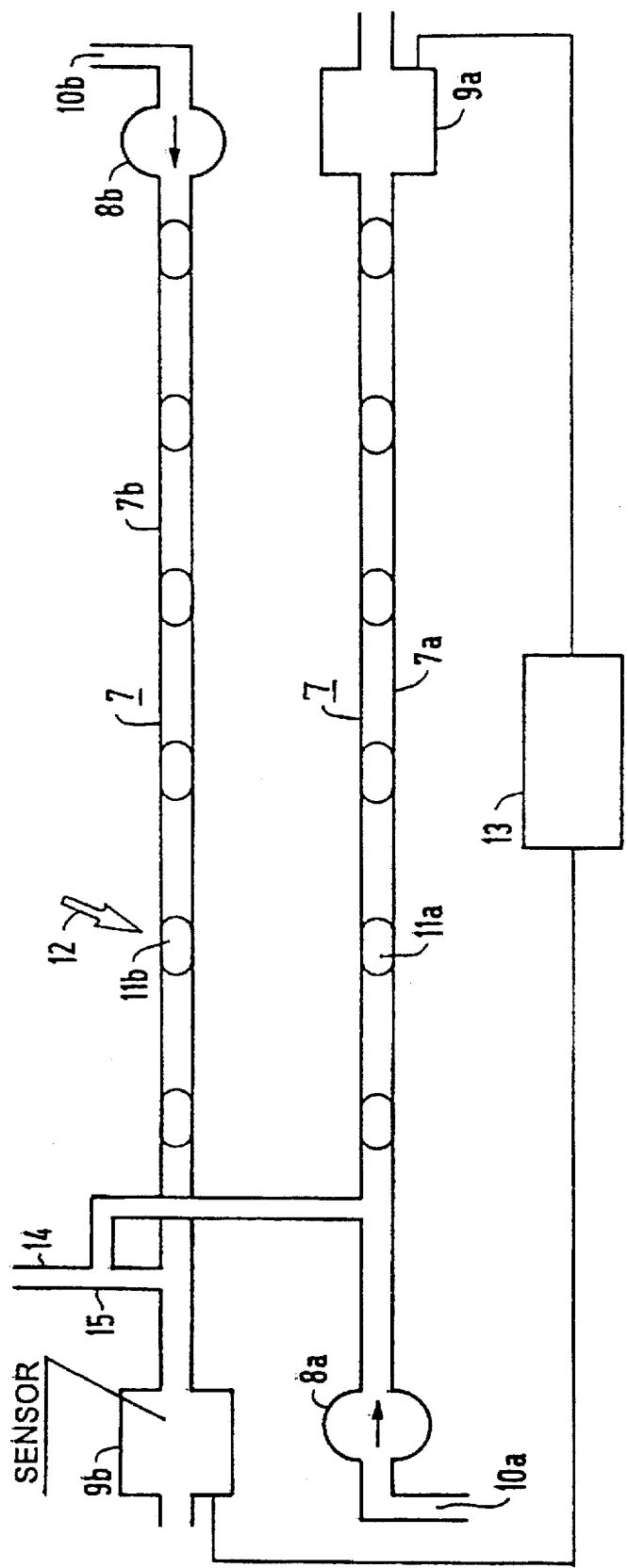
FIG. 2 is a view similar to FIG. 1 of a second embodiment of the device.

FIG. 2 represents a device for locating accumulations of pollutants, which corresponds to a great degree with the device according to FIG. 1, with regard to structure and mode of operation. However, a collecting line 7 is formed of two legs 7a and 7b, each of which is connected to a respective pump 8a, 8b and a respective sensor 9a, 9b. Furthermore, each leg 7a and 7b has its own aspirating point 10a, 10b. The pumps 8a, 8b can be connected to the beginning or the end of the legs 7a, 7b. The legs 7a and 7b are disposed close to each other and parallel with each other, just as with the legs 1a and 1b of FIG. 1. Permeable locations 11a and 11b in the two legs 7a, 7b are located directly next to each other so that a pollutant which reaches the vicinity of the legs 7a, 7b, as is indicated by an arrow 12, can penetrate the two legs 7a, 7b almost simultaneously.

In accordance with FIG. 2, the two sensors 9a, 9b are connected with one evaluating unit 13. In the case when concentration maxima of a pollutant are registered first by one of the sensors 9a, 9b and, after an interval in time, at the other sensor 9b, 9a, the spatial distance between the location of the pollutant penetration and one of the sensors 9a, 9b is determined from this interval in time with the aid of the known flow speed of the conveying medium and the known length of the two legs 7a, 7b.

In order to calibrate the device illustrated in FIGS. 1 and 2, it is possible to introduce a test gas simultaneously into both legs 1a, 1b; 7a, 7b. A supply line 14 is provided for the test gas which passes through a T-element 15 and terminates at closely adjoining points into the legs 1a, 1b; 7a, 7b. The terminations into the legs 1a, 7a and 1b, 7b are located across from each other, just as the permeable locations 5a, 11a and 5b, 11b. Variations in the drawings are a result of the representational possibilities. In order to perform a calibration, the location where the test gas is introduced into the legs 1a, 1b; 7a, 7b is determined through the use of the devices shown. The test gas can also be brought into the vicinity of a previously determined pair of closely adjoining permeable locations 5a, 5b; 11a, 11b in a directed manner.

It is possible to rapidly locate an accumulation of pollutants in a simple manner through the use of the method and the device according to the invention.

The method and the device according to the invention can be employed, for example, for monitoring pipelines or for air monitoring in industrial plants. In the process it is possible to locate leaks in a pipeline or also in other lines or in a reservoir. When used for air monitoring, it is possible in a general way to locate locations having increased concentrations of pollutants.

I claim:

1. A device for locating accumulations of pollutants, comprising:

a collecting line being permeable to a pollutant and having two legs being closely adjacent, mutually parallel and connected as forward and return lines;

a continuously operating pump connected to said collecting line for continuously guiding a conveying medium through said collecting line;

a sensor connected to an outlet of said collecting line for detecting a pollutant at the outlet;

an evaluation unit connected to said sensor, said evaluation unit determining a location of an accumulation of pollutants at said collecting line from a difference in time between two successive pollution detections at the outlet of said collecting line.

2. The device according to claim 1, wherein said two legs are connected in series.

3. The device according to claim 1, including another pump and another sensor, said two legs each being connected to a respective one of said pumps and to a respective one of said sensors as an independent conveying line, and said evaluation unit being connected to said sensors.

4. The device according to claim 1, wherein said legs have locations being permeable to the pollutant and remaining portions being impermeable to the pollutant, and a permeable location in one of said legs is spatially near to a permeable location in the other of said legs.

5. The device according to claim 1, including a feed line, and a T-element connecting said feed line to said two legs at spatially adjacent locations.

6. A device for locating accumulations of pollutants, comprising:

a collecting line being permeable to a pollutant and having two legs being closely adjacent, mutually parallel and connected as forward and return lines;

a continuously operating pump being connected to said collecting line for conveying a conveying medium through said collecting line;

a sensor being connected to said collecting line for detecting a pollutant;

an evaluation unit being connected to said sensor; and another pump and another sensor, said two legs each being connected to a respective one of said pumps and to a respective one of said sensors as an independent conveying line, and said evaluation unit being connected to said sensors.

* * * * *